Nov. 19, 1929.  S. HALAPIN  1,735,967
RAIL JOINT LOCK
Filed April 22, 1929
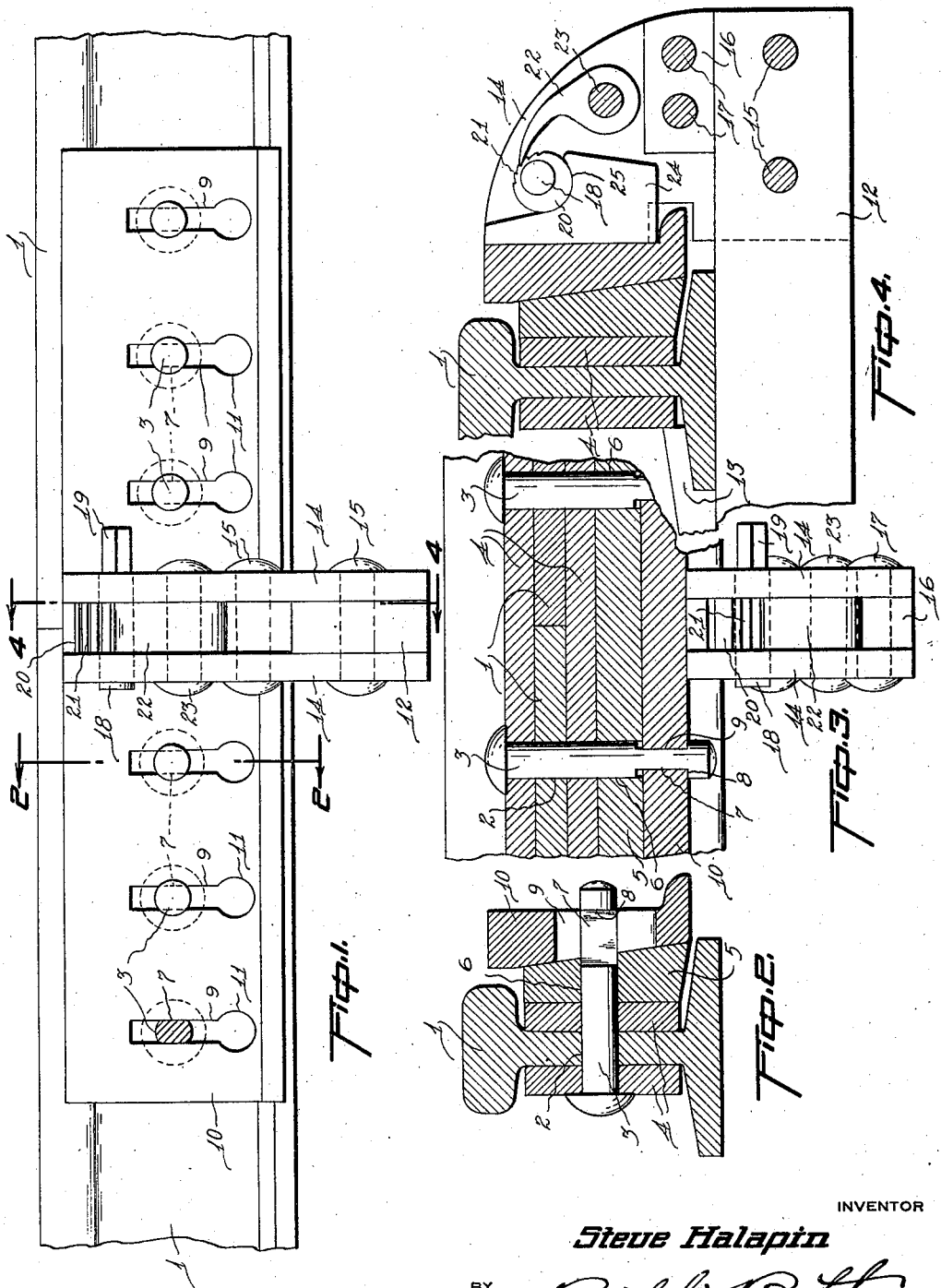
INVENTOR
Steve Halapin
BY
ATTORNEYS Patented Nov. 19, 1929

1,735,967

UNITED STATES PATENT OFFICE

STEVE HALAPIN, OF DETROIT, MICHIGAN

RAIL-JOINT LOCK

Application filed April 22, 1929. Serial No. 356,900.

The present invention pertains to a novel rail joint locking mechanism for joining the abutting ends of railway rails.

The principal object of the invention is to devise a mechanism for joining the abutting ends of railway rails whereby the rails are firmly secured together in a manner assuring rigidity and requiring a comparatively small amount of time as compared with the ordinary manner in which the rails are joined. By the present construction it is made possible to drill the rails in the usual manner and use the fish-plates which are commonly used and secured together by bolts passed through drilled holes in the abutting ends of the rails. Ordinarily the several bolts in constructions of this nature are each provided with a nut and each nut must be screwed tight independently from the other. With the present invention this individual tightening operation for each bolt is avoided and all the bolts are tightened by a single operation and positively locked in the tightened position.

With this and other objects in view my invention is fully set forth and more particularly pointed out in the appended claims, reference being had to the accompanying drawings, in which:

Figure 1 is a side elevation of abutting ends of railway rails joined in accordance with the present invention;

Figure 2 is a transverse cross sectional view taken on the line 2—2 of Figure 1;

Figure 3 is a horizontal cross sectional view through the abutting ends of the rails, and Figure 4 is a transverse cross-sectional view on the line 4—4 of Figure 1.

Like characters are employed to designate the corresponding parts throughout.

The numeral 1 indicates a pair of railway-rails with their ends abutting one against the other, each rail being provided with a series of drilled holes 2 for accommodating bolts 3 which are provided to secure the fish-plates 4 in their proper place, this construction being in accordance with the conventional method of joining rails. The bolts 3 are of sufficient length that one end of each bolt extends beyond the face of the fish plate as clearly illustrated in Fig. 2 and over these projecting ends is placed a wedge plate 5 having drilled holes 6 to accommodate the bolts 3. The portions of the bolts 3 which project beyond the wedge plate 5 are provided with grooves 7 which form a shoulder 8, the grooves 7 being received in a slot 9 formed in an opposing wedge plate 10, the slot 9 being enlarged as at 11.

The installation and operation of the parts as described is as follows, the bolts 3 are passed directly through drilled holes in the fish plates, the rails and the wedge plate 5 and the enlargement 11 at the bottom of the slot 9 permits the wedge plate 10 to be placed over the ends of the bolts. The slots 9 engage in the grooves 7 so that the shoulders 8 engage the face of the wedge plate 10 and when the wedge plate 10 is moved downwardly it co-acts with the wedge plate 5 to tightly clamp the fish plates 4 alongside the rails 1 and secure the bolts 3 in a position holding the fish plates.

A cross-member 12 is passed beneath the rails and one side is provided with a member 13 adapted to overlap the flare on the bottom of the rails 1, the opposite end of the cross member supporting the wedge operating mechanism. Plates 14 are secured to the member 12 by bolts 15 and are reinforced by a block 16 secured by bolts 17, the plates supporting a shaft 18 having a squared end 19 to accommodate a crank or a wrench. Intermediate the ends of the shaft 18 is provided an eccentric cam 20 having the ratchet teeth 21 which are engaged by the pawl 22 supported on a shaft 23 mounted in the plates 14. A bracket 24 engages the wedge plate 10 and has a rounded portion 25 which is engaged by the eccentric cam 20.

Fig. 4 of the drawing illustrates the device in the locked position which is obtained by rotating the shaft 18 by means of a wrench applied to the portion 19. Rotation of the shaft 18 causes the eccentric 20 to bear downwardly upon the bracket 24 and thereby forces the wedge plate 10 downwardly to hold the rails together in the manner previously described. When the shaft 18 has been rotated a sufficient distance to cause the wedge plate 10 to be moved to a tightened position the pawl 22 is moved into engagement with the teeth 21 and thereby prevents rotation of the eccentric 20 which in turn prevents any of the members from loosening.

Although a specific embodiment of my invention has been illustrated and described it is to be understood that various alterations may be made in the details of construction without departing from the spirit of the invention as depicted in the following claims.

What I claim is:—

1. The combination with the abutting ends of rails and fish plates adapted to be secured alongside thereof, of a plurality of bolts passed through said rail ends and said fish plates, a wedge member adapted to engage said bolts whereby movement of said wedge member tightens all of said bolts, and an eccentric member in engagement with said wedge member whereby rotation of said eccentric moves said wedge member to tighten said bolts.

2. The combination with the abutting ends of rails and fish plates adapted to be secured alongside thereof, of a plurality of bolts passed through said rail ends and said fish plates, a wedge member adapted to engage said bolts whereby movement of said wedge member tightens all of said bolts, an eccentric member in engagement with said wedge member whereby rotation of said eccentric moves said wedge member to tighten said bolts, and means preventing rotation of said eccentric in a direction permitting a loosening of said bolts.

3. The combination with the abutting ends of rails and fish plates adapted to be secured alongside thereof, of bolts passed through said rail ends and said fish plates, wedge plates passed over said bolts whereby movement of one of said wedge plates tightens all of said bolts, an eccentric adapted to move said last named wedge plate, a ratchet formed on said eccentric, and a pawl adapted to engage said ratchet to prevent backward rotation of said eccentric.

In testimony whereof I affix my signature.

STEVE HALAPIN.